(12) United States Patent
Patro

(10) Patent No.: US 7,389,116 B1
(45) Date of Patent: Jun. 17, 2008

(54) SYSTEM, METHOD, AND COMPUTER PROGRAM PRODUCT FOR SHORT MESSAGE SERVICE (SMS) RATING

(75) Inventor: Debabrata Patro, Pune (IN)

(73) Assignee: Amdocs Software Systems Limited, Dublin (IE)

( * ) Notice: Subject to any disclaimer, the term of this patent is extended or adjusted under 35 U.S.C. 154(b) by 65 days.

(21) Appl. No.: 11/211,354

(22) Filed: Aug. 24, 2005

(51) Int. Cl.
*H04Q 7/20* (2006.01)

(52) U.S. Cl. ............... 455/466; 455/408; 455/520; 455/406; 370/328

(58) Field of Classification Search .......... 455/466, 455/520, 406
See application file for complete search history.

(56) References Cited

U.S. PATENT DOCUMENTS

| | | | |
|---|---|---|---|
| 7,092,697 B1 * | 8/2006 | Kupsh et al. ............... 455/406 |
| 7,130,650 B2 * | 10/2006 | Noldus ....................... 455/466 |
| 2002/0058522 A1 * | 5/2002 | Kim et al. .................. 455/466 |
| 2002/0142787 A1 * | 10/2002 | Holley et al. .............. 455/466 |
| 2002/0193127 A1 * | 12/2002 | Martschitsch .............. 455/466 |
| 2003/0003953 A1 * | 1/2003 | Houplain .................... 455/553 |
| 2003/0036394 A1 * | 2/2003 | Henry-Labordere ........ 455/466 |
| 2003/0216147 A1 * | 11/2003 | Morin et al. ............... 455/466 |
| 2004/0258068 A1 * | 12/2004 | Lim et al. .................. 370/394 |

FOREIGN PATENT DOCUMENTS

WO    WO01/72001 A2    9/2001

\* cited by examiner

*Primary Examiner*—Rafael Perez-Gutierrez
*Assistant Examiner*—Nimesh Patel
(74) *Attorney, Agent, or Firm*—Zilka-Kotab, PC

(57) ABSTRACT

A rating system, method and computer program product are provided. A message is identified, after which it is determined whether the message is concatenated. The message is then rated based on the determination.

23 Claims, 5 Drawing Sheets

SYSTEM, METHOD, AND COMPUTER PROGRAM PRODUCT FOR SHORT MESSAGE SERVICE (SMS) RATING

FIELD OF THE INVENTION

The present invention relates to billing systems, and more particularly to billing for messaging services.

BACKGROUND

The 3rd Generation Partnership Project (3GPP) standard supports concatenated short message service (SMS) messages. Mobile devices supporting concatenated SMS have the ability to send a "long" SMS message (e.g. with a size more than 140 bytes, etc.) as multiple SMS messages, with an indication that such messages are a part of a concatenated SMS message. Mobile devices that receive the messages have the ability to combine the messages, and present them as a single message to the user.

Such technology is enabled by the use of Transfer protocol User Data Header (TP-UDH) technology. TP-UDH allows the use of binary data in a normal SMS, prior to the text itself. The binary data consumes part of the limit (e.g. 140 bytes, etc.) of the SMS message. It should be noted that a single message in English can include 160 characters, whereas a message of 307 characters may be broken into 3 messages, since part of the message text length is used for the header information. At an application level, an SMS message is manipulated in the form of a Transport Protocol Data Unit (TPDU). The TPDU is a sequence of parameters containing information including whether it is a component of a concatenated message.

Recently, most mobile devices are configured to support concatenated SMS messages. While this capability is very useful as it extends the limit on the information that can be exchanged using the SMS protocol, SMS messages are currently rated by occurrence, without any consideration of the fact that they are part of a concatenated SMS. In other words, each SMS message is unconditionally billed separately. For example, if a concatenated SMS message is divided into 3 messages, a user is billed for 3 separate messages.

Unfortunately, one ramification of the foregoing is that, in the case of prepaid subscribers, for example, a decision as to whether an SMS message can be delivered or not is based on individual messages. Thus, it is possible that only a part of a long SMS will be delivered, if a prepaid balance is not sufficient for all of the components of the message.

There is thus a need for overcoming these and/or other problems associated with the prior art.

SUMMARY

A rating system, method and computer program product are provided. A message is identified, after which it is determined whether the message is concatenated. The message is then rated based on the determination.

DETAILED DESCRIPTION

Figure 1:
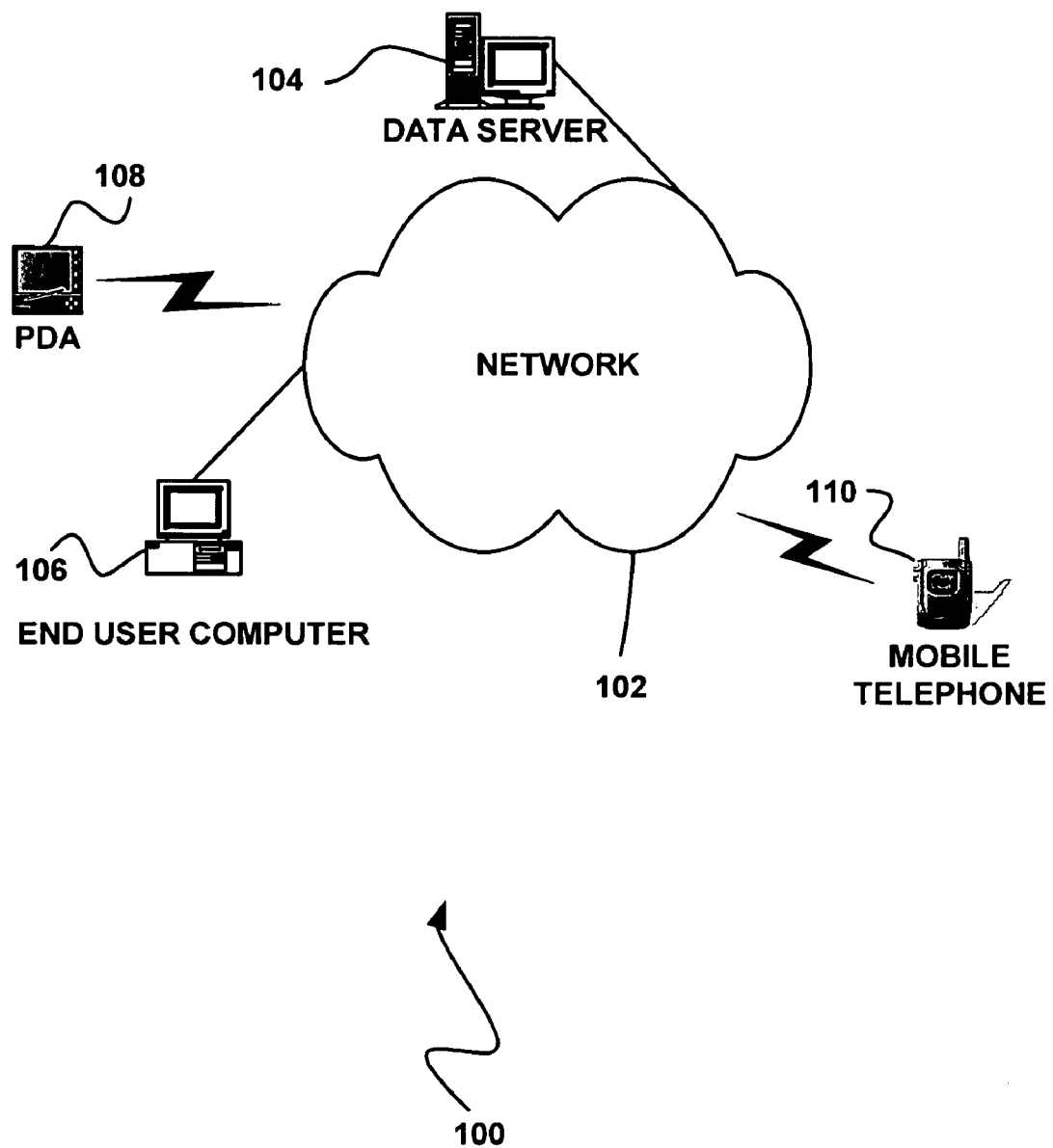
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a telecommunications network, a local area network (LAN), a wireless network, a wide area network (WAN) such as the Internet, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, etc.

It should be noted that any of the foregoing devices in the present network architecture 100, as well as any other unillustrated hardware and/or software, may be equipped with the capability of rating concatenated messages. More exemplary information regarding such architecture and associated functionality will be set forth hereinafter in greater detail.

Figure 2:
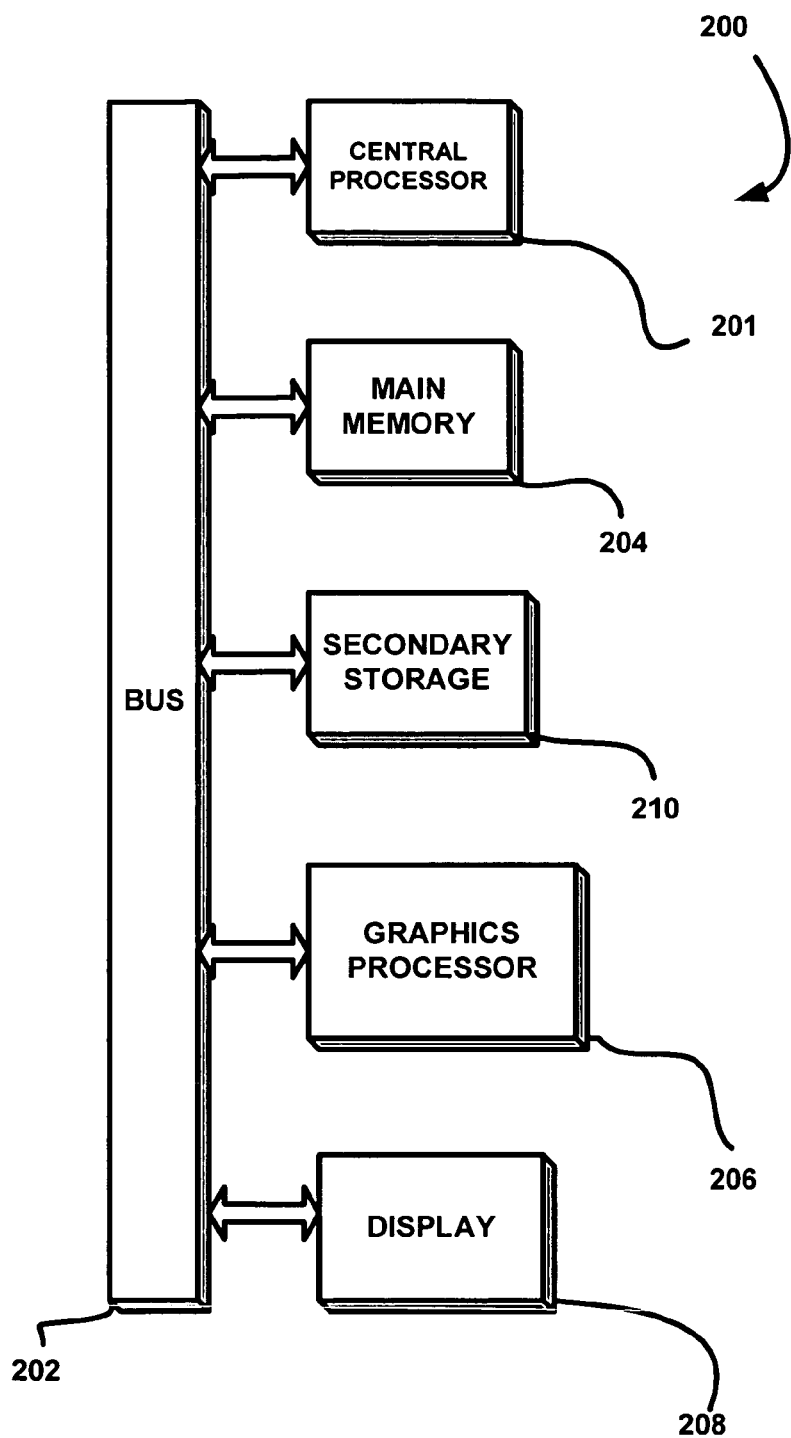
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media.

Figure 3:
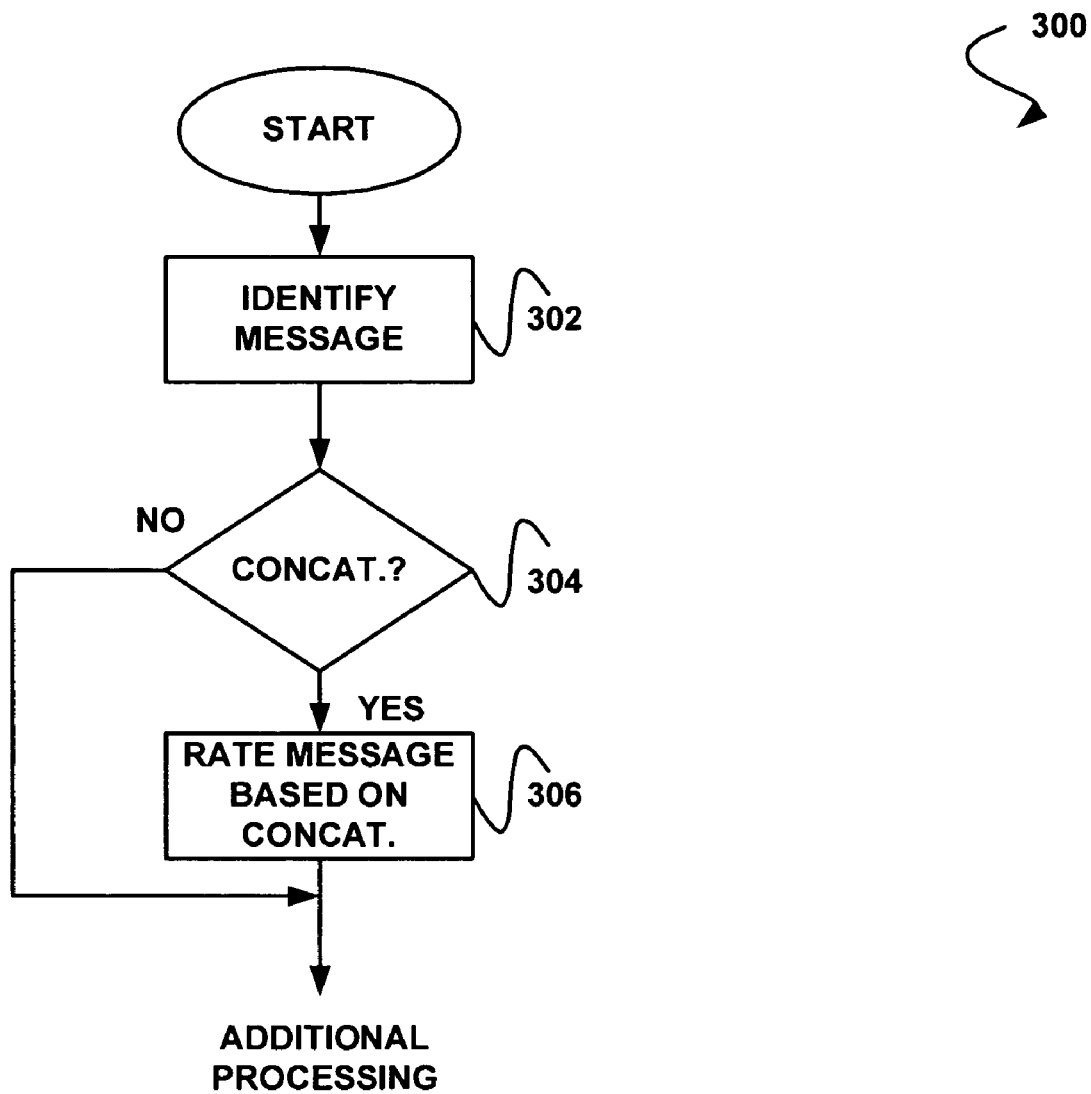
FIG. 3 shows a method for short message service (SMS) rating, in accordance with one embodiment.

FIG. 3 shows a method 300 for rating concatenated messages, in accordance with one embodiment. As an option, the present system 300 may be implemented in the context of the architecture and environment of FIGS. 1 and/or 2. Of course, however, the system 300 may be implemented in any desired environment.

As shown in operation 302, a message is identified. The message may be any type of message capable of being sent between devices (e.g. see, for example, the devices of FIG. 1, etc.) over a network (e.g. see, for example, the network 102 of FIG. 1, etc.), and further capable of being concatenated. For example, the message may be a text message, an HTML message, a multimedia message, etc.

In one embodiment, the message may be a concatenated short message service (SMS) message that is communicated utilized the SMS protocol. For example, devices utilizing the 3G Project partnership (3GPP) standard may support such concatenated messages. Thus, when a device attempts to send a message that is larger than a predefined amount (e.g. more than 140 bytes, etc.), the message may be sent as a plurality of messages, each being a portion of the original message. Then, the receiving device may combine the plurality of messages in the form of the original message. In this way, a user of the receiving device may receive the message in an original form.

It should be noted that the message may be identified in any desired manner. For example, the message may be identified in real-time by a service provider. Still yet, the message may be identified by a back-end billing system. In any case, any sort of desired data structure, signaling, etc. may be used to facilitate such identification. Of course, the message may be identified utilizing any technique capable of facilitating the rating of the message.

It is then is determined in operation 304 whether the message is concatenated. In one embodiment, such determination may be made by simply inspecting the message (or component thereof), using a data structure associated with the message, etc. It should be noted, however, that any determination may be utilized which is capable of identifying a message as being concatenated.

In one embodiment, at least one message may be sent from a first device to a short message service center (SMSC). The SMSC may then be able to determine whether the message is a part of a concatenated message. In addition, the SMSC may also determine the number of components (e.g. messages, etc.) that make up the concatenated message. Such determinations may then be sent to a service provider associated with the device sending and/or receiving the message. For example, the SMSC may provide a record including a concatenated message identifier for identifying whether a message is concatenated and/or a concatenated message component number identifier for identifying a number of components of the concatenated message. More information regarding the SMSC and optional related functionality will be set forth hereinafter during reference to subsequent figures. While a SMSC is set forth as one example of an entity carrying out operation 304, it should be noted that absolutely any device (which could be the same or different than that which carries out operation 302) may be utilized which is capable of making the concatenation determination.

After it is determined in operation 304 whether the message is concatenated, the message may then be rated (e.g. priced, billed, accounted for, charged, taxed, tolled, assessed, scored, counted, etc) based on the determination, as shown in operation 306. As an option, the number of components that make up the concatenated message may be utilized, at least in part, for rating the concatenated message. Further, a rate may be applied to each component making up the concatenated message, and then a single rate may be provided based on each rate applied to each component.

In this way, the concatenated message may be rated according to the number of components required for sending the concatenated message while only charging a user of the receiving and/or sending device for a single event (i.e. the single concatenated message). Optionally, a rate (e.g. price) for a concatenated message may be variable such that it is determined according to a stepped rating mechanism. For example, the rate may be a function of a number of components associated with the concatenated message, such that the variable rate is determined by identifying in which of a plurality of ranges the number resides. Thus, each range may be associated with a unique price.

See Table 1 for an example of a rating scheme utilized for rating messages. Of course, it should be noted that any rating scheme may be utilized for rating purposes.

TABLE 1

| TYPE | RATE PER MESSAGE |
| --- | --- |
| Single message | $0.05 |
| Concatenated message with 2 components | $0.05 |
| Concatenated message with 3 to 5 components | $0.48 |
| Concatenated message with 6 to 10 components | $0.40 |
| Concatenated message with more than 10 components | $0.30 |

Therefore, users may be charged for messages sent between devices according to whether the message is concatenated. Thus, a more accurate rate may be applied to concatenated messages, rather than simply treating each message that is part of the concatenated message as a single, independent message. Furthermore, with the information obtained about whether the message is concatenated, prepaid subscribers that wish to utilize a messaging service may be charged for the concatenated message as a whole, thus possibly eliminating the chance that only a portion of the concatenated message will be sent when additional funds are not available for sending the remaining portions.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
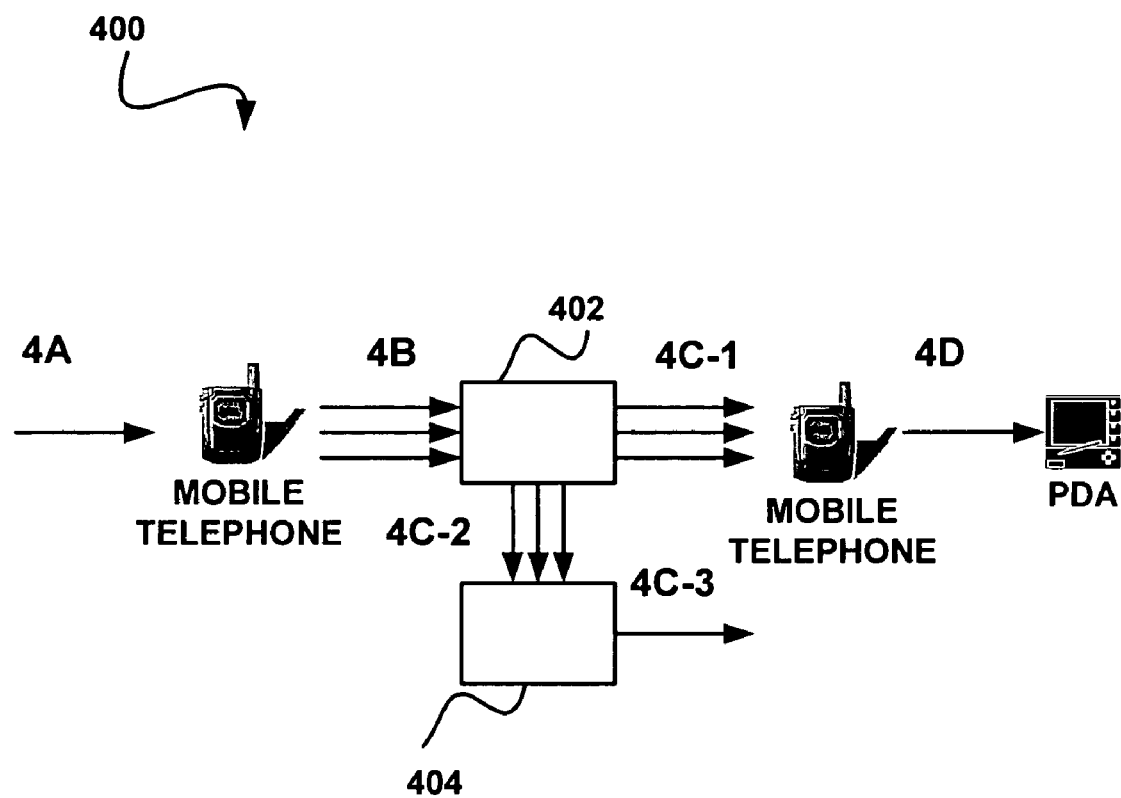
FIG. 4 shows a method for SMS rating in a post-paid rating environment, in accordance with another embodiment.

FIG. 4 shows a method 400 for SMS rating in a post-paid rating environment, in accordance with another embodiment. As an option, the present method 400 may be implemented in the context of the architecture and environment of FIGS. 1-3 (including the definitions provided in the description of FIG. 3). Of course, however, the method 400 may be implemented in any desired environment.

Initially, in operation 4A, a user enters a message into a device. As shown, the device is a mobile telephone, however it should be noted that any device capable of sending messages may be utilized. The message may be any type of message capable of being sent by the device, including, but not limited to, a message that is larger than a predefined amount.

The message is then sent from the device to an SMSC 402, as shown in operation 4B. If the message is larger than the predefined amount, the message may be sent to the SMSC 402 in the form of a plurality of components, each being a portion of the original message. The SMSC 402 may include any hardware device capable of transmitting the message to a receiving device. The SMSC 402 may also be capable of determining if messages received at the SMSC 402 are associated with a single concatenated message, and identifying a number of components associated with the single concatenated message.

Once the message is received at the SMSC 402 in operation 4B, the message is then sent to a receiving device, as in operation 4C-1. As shown, the receiving device is a mobile telephone, however it should be noted that any device capable of receiving messages may be utilized. Again, a plurality of message components may be sent to the receiving device in operation 4C-1 if the original message received in operation 4B is a concatenated message.

The receiving device may then simply display the message on the receiving device if the message is not part of a concatenated message. However, if a plurality of the received components of operation 4C-1 are portions of a single concatenated message, the receiving device may assemble each component that is a portion of the single concatenated message for display by the device (see operation 4D). Of course, the concatenated message may be assembled in the form originally entered by the user in operation 4A.

Furthermore, the SMSC 402 may also identify information about each message, such as, for example, whether the message is concatenated and a number of components that make up the concatenated message. Such information may also be sent to a separate system 404 in order to be analyzed and filtered, as shown in operation 4C-2. Thus, the SMSC 402 may be capable transmitting the information to the separate system 404 for rating purposes. Of course, in various embodiments, the information may also be analyzed and filtered by the SMSC 402, if it employs such capabilities.

Once the information is received at the separate system 404, the separate system 404 determines a rate for each message. If the message is a part of a concatenated message, a single rate is determined for the concatenated message based on, as least in part, a rating for each of the components that make up the concatenated message. Note Table 1, for example. Such single rate may then be transferred to a phone service provider for billing purposes, as shown in operation 4C-3.

Figure 5:
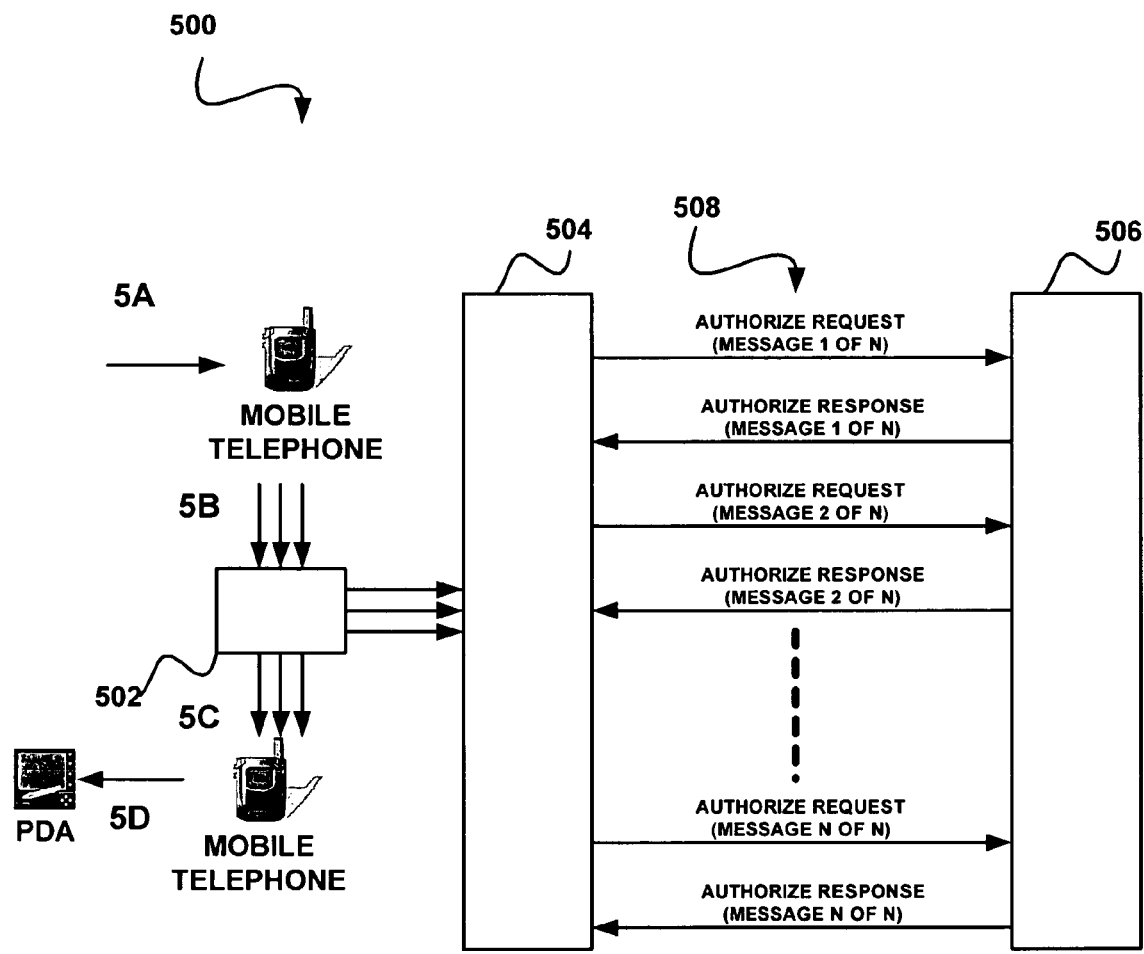
FIG. 5 shows a method for SMS rating in a pre-paid rating environment, in accordance with yet another embodiment.

FIG. 5 shows a method 500 for SMS rating in a pre-paid rating environment, in accordance with yet another embodiment. As an option, the present method 500 may be implemented in the context of the architecture and environment of FIGS. 1-3 (including the definitions provided in FIG. 3). Of course, however, the method 500 may be implemented in any desired environment.

Initially, in operation 5A, a user enters a message into a device. As shown, the device is a mobile telephone, however it should be noted that any device capable of sending messages may be utilized. The message may be any type of message capable of being sent be the device, including, but not limited to, a message that is larger than a predefined amount.

The message is then sent from the device to an SMSC 502, as shown in operation 5B. If the message is larger than the predefined amount, the message may be sent to the SMSC 502 in the form of a plurality of components, each being a portion of the original message. The SMSC 502 may include any hardware device capable of transmitting the message to a receiving device. The SMSC 502 may also be capable of determining if messages received at the SMSC 502 are associated with a single concatenated message, and identifying a number of components associated with the single concatenated message.

Once the message is received at the SMSC 502 in operation 5B, the message is then sent to a receiving device, as in operation 5C. As shown, the receiving device is a mobile telephone, however it should be noted that any device capable of receiving messages may be utilized. Optionally, the message may not be sent to a receiving device until the message is authorized, which will be described in further detail with respect to operation 508.

Again, a plurality of message components may be sent to the receiving device in operation 5C, if the original message received in operation 5B is a concatenated message. The receiving device may simply display the message on the receiving device if the message is not part of a concatenated message. On the other hand, if a plurality of the received components of operation 5C are portions of a single concatenated message, the receiving device may assemble each component that is a portion of the single concatenated message for display by the device (see operation 5D). Of course, the concatenated message may be assembled in the form originally entered by the user in operation 5A.

The SMSC 502 may also be capable of sending information associated with each received message of operation 5B to a Service Call Provider (SCP)/Intelligent Network (IN) 504. For each received message component that is part of a concatenated message, the SCP/IN 504 sends an authorization request along with the number of components that are part of a concatenated message to an online charging system 506, such as a post-paid billing system or a pre-paid billing system, as shown in operation 508. For the first message that is part of a concatenated message and that is sent for authorization in operation 508, a session is created for the associated concatenated message.

Thus, after each message component that is part of the concatenated message is sent for authorization in operation 508, each message may be either authorized and rated or rejected and rated with a zero. After all of the components that are part of a concatenated message are sent for authorization in operation 508, the concatenated message may either be authorized or rejected as a whole. Such authorization or rejection may, of course, be based on a balance amount available in an associated pre-paid subscriber's account. Thus, if any of the message components are rejected for a single session, the entire concatenated message associated with that session may be rejected.

In this way, portions of a concatenated message will be prevented from being sent to a device if a balance amount available in an associated pre-paid subscriber's account is not sufficient to send all of the message components associated with the entire concatenated message. However, if the balance is sufficient, a total rate for all of the combined message components associated with a concatenated message may be subtracted from an account of the sender and/or receiver.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a message;
   determining whether the message is concatenated utilizing a data structure associated with the message, wherein if it is determined that the message is concatenated:
   sending an authorization request for each of a plurality of message components of the concatenated message, where a session is established in response to the authorization request for a first message component of the concatenated message;

rating each of the plurality of message components associated with the session based on results of the authorization request; and authorizing the concatenated message based on the results of the authorization requests associated with each of the plurality of message components; and rating the message based on the determination.

2. A method as recited in claim 1, wherein the message is communicated utilizing a short message service (SMS) protocol.

3. A method as recited in claim 1, wherein the rating is performed by a post-paid billing system.

4. A method as recited in claim 3, wherein the rating provides a price charged for the message.

5. A method as recited in claim 1, wherein the rating is performed by a pre-paid billing system.

6. A method as recited in claim 5, wherein the rating subtracts a price charged from an account for the message.

7. A method as recited in claim 1, wherein, if it is determined that the message is concatenated, the rating includes charging a single price for the concatenated message.

8. A method as recited in claim 7, wherein the single price is the same irrespective of a number of components of the concatenated message.

9. A method as recited in claim 1, wherein, if it is determined that the message is concatenated, the rating includes charging a variable price for the concatenated message.

10. A method as recited in claim 9, wherein the variable price is a function of a number of components of the concatenated message.

11. A method as recited in claim 10, wherein the variable price is determined by determining in which of a plurality of ranges the number resides.

12. A method as recited in claim 11, wherein each range includes an associated unique price.

13. A method as recited in claim 9, and further comprising determining whether the variable price is authorized based on a current balance.

14. A method as recited in claim 13, and further comprising conditionally authorizing the concatenated message based on the determination.

15. A method as recited in claim 1, wherein the rating is based on a record including a concatenated message identifier identifying whether the message is concatenated.

16. A method as recited in claim 1, wherein the rating is based on a record including a concatenated message component number identifier identifying a number of components of the concatenated message.

17. A method as recited in claim 1, wherein the message is communicated utilizing a wireless network.

18. A computer readable medium tangibly embodying a computer program, comprising:

computer code for identifying a message;

computer code for determining whether the message is concatenated utilizing a data structure associated with the message, wherein if it is determined that the message is concatenated:

an authorization request is sent for each of a plurality of message components of the concatenated message, where a session is established in response to the authorization request for a first message component of the concatenated message;

each of the plurality of message components associated with the session is rated based on results of the authorization request; and the concatenated message is authorized based on the results of the authorization requests associated with each of the plurality of message components; and computer code for rating the message based on the determination.

19. A method as recited in claim 1, wherein the authorization request associated with the first message component of the concatenated message indicates a number of message components associated with the concatenated message.

20. A method as recited in claim 1, wherein a message component associated with an unauthorized result of the authorization request is rated with a zero.

21. A method as recited in claim 1, wherein the concatenated message is authorized if all of the results associated with the authorization requests for each of the plurality of message components include authorized results.

22. A method as recited in claim 1, wherein each of the plurality of message components of the concatenated message are sent to a destination device if the concatenated message is authorized.

23. A method as recited in claim 1, wherein rating the message includes determining a total rate for each of the plurality of message components of the concatenated message, where the total rate is based on the rating for each of the plurality of message components associated with the session.

* * * * *